United States Patent [19]

Robinson

[11] 4,084,962
[45] Apr. 18, 1978

[54] AFTER-TREATING ALLOY FOR MAKING NODULAR IRON

[75] Inventor: Michael Robinson, Bettendorf, Iowa

[73] Assignee: Deere & Company, Moline, Ill.

[21] Appl. No.: 672,048

[22] Filed: Mar. 30, 1976

Related U.S. Application Data

[62] Division of Ser. No. 471,684, May 20, 1974, Pat. No. 3,955,973.

[51] Int. Cl.² ............................................. C22C 33/08
[52] U.S. Cl. ............................... 75/130 A; 75/123 L; 75/134 S; 75/170
[58] Field of Search .................. 75/130, 170, 134 S, 75/123 L

[56] References Cited

U.S. PATENT DOCUMENTS

| | | |
|---|---|---|
| 2,435,761 | 10/1949 | Millis ........................................ 75/123 |
| 2,711,953 | 6/1955 | Vennerholm ............................. 75/53 |
| 2,841,489 | 7/1958 | Morrogh .................................. 75/125 |
| 3,033,676 | 5/1962 | Cox ......................................... 75/134 S |
| 3,421,887 | 1/1969 | Kusaka ..................................... 75/130 |

Primary Examiner—P. D. Rosenberg
Attorney, Agent, or Firm—Burns, Doane, Swecker & Mathis

[57] ABSTRACT

An improvement in a process for making modular iron is disclosed. Prior to casting, an iron melt which has previously been contacted with a graphite-spheroidizing agent is further contacted with an after-treating alloy agent containing about 0.8 to about 1.8 weight percent magnesium. Magnesium utilization in the pre-casting step is unusually high and the amount of graphite-spheroidizing agent can be substantially reduced without detrimentally affecting the metallurgical or physical properties of the resulting nodular iron product. The after-treating alloy agent is also claimed.

4 Claims, 2 Drawing Figures

4,084,962

AFTER-TREATING ALLOY FOR MAKING NODULAR IRON

This is a division of application Ser. No. 471,684, filed May 20, 1974 now U.S. Pat. No. 3,955,973.

BACKGROUND OF THE INVENTION

Nodular iron (also known as nodular cast iron, ductile iron, spherulitic iron and spherulitic graphite iron) is cast iron in which the graphite is present in tiny balls, spheroids or spherulites instead of flakes (as in gray iron) or compacted aggregates (as in malleable iron). The spheroidal graphite structure is produced by the addition of one or more graphite-spheroidizing agent to molten iron. A number of elements (e.g., magnesium, cerium, calcium, lithium, sodium, barium) have been found to be suitable graphite-spheroidizing agents of which magnesium and cerium (and particularly magnesium) are commercially important.

The graphite-spheroidizing agents generally are quite oxidizable and have low boiling points compared with iron. A wide variety of processes and apparatuses have been developed to introduce a graphite-spheroidizing agent such as magnesium into molten cast iron. Many of these known techniques utilize relatively complicated, expensive and/or cumbersome equipment or compositions. Also, violent, uncontrolled reactions often occur with the introduction of magnesium into iron which reactions pose serious safety hazards.

A number of widely used methods include, for example, the use of a high strength ladle and cover which seal the molten iron while a ram forces magnesium (usually in alloy form) into the melt. Magnesium may also be placed in a ladle into which molten iron is rapidly poured. Often the magnesium is first covered by a sheet of iron or steel prior to addition of the molten iron.

In spite of various precautions attempted with such methods, the loss of magnesium by volatilization and/or combustion is considerable and, concomitantly, the reaction efficiency (measured in terms of magnesium recovery) is quite low. It has been found that magnesium recovery in the spheroidizing treatment generally is between 20 and 60 percent depending on the particular technique used. On the average, magnesium recovery in commercial spheroidizing treatments is about 38 percent.

The search for more efficient processes for producing nodular iron has continued.

Often, nodular iron is contacted just prior to casting (i.e., within 15, often within 10, minutes before casting) with an inoculant alloy, usually a ferrosilicon alloy, which additionally promotes graphitization in the iron. That is, the first (or "spheroidizing") treatment may be sufficient to completely spheroidize all of the graphite present but it may be insufficient to graphitize all of the carbon present. The inoculant treatment promotes graphitization, governs the amount of graphite formed and also may be used to introduce small amounts of alloying elements into the nodular iron.

U.S. Pat. No. 3,033,676, for example, discloses an inoculant alloy which is primarily useful as a graphitizing inoculant in the treatment of foundry gray irons to produce gray iron containing randomly distributed flakes or flake graphite type A. This inoculant alloy (which broadly includes 0.1 to 5 percent magnesium, 0.1 to 10 percent aluminum, 0.1 to 60 percent nickel or iron or both and 15 to 99.6 percent silicon) is also suggested for use in the production of nodular iron either as a substitute for the graphite-spheroidizing agent or in addition and subsequent thereto. Suitable alloys disclosed therein include 2 or 3 percent magnesium.

It has been found, however, that the use of an inoculant alloy containing 2 or 3 more percent magnesium with nodular iron prior to casting of the nodular iron is accompanied by a violent, hazardous reaction of the same type that occurs in the spheroidizing of casting iron with magnesium. In view of the health and safety hazards created thereby (particularly in view of the stringent requirements of the recently adopted Occupational Safety and Health Act), the use of such magnesium-containing inoculants has been essentially stopped. Instead, inoculation prior to casting is typically conducted with a non-magnesium-containing ferrosilicon alloy.

OBJECTS AND SUMMARY OF THE INVENTION

It is an object of this invention to provide efficient utilization of magnesium in a process for the production of nodular iron.

It is an object of this invention to provide a process for the production of nodular iron which allows control of nodular size and distribution in the products and an agent for use in such processes.

It is also an object of this invention to provide an improved process for the production of nodular iron which presents a substantially reduced safety and health hazard and an agent for use in such process.

These and other objects of the invention are provided in one aspect of the present invention in a process for the production of cast nodular iron in which molten iron is first contacted with a graphite-spheroidizing agent in an amount sufficient to yield from about 0.03 to 0.075 weight percent graphite-spheroidizing agent in the cast nodular iron, the improvement which comprises after-treating the contacted melt with an after-treating agent compatible with said contacted melt and containing from about 0.8 to about 1.8 percent by weight of magnesium whereby said first contacting can be performed with a reduced amount of graphite-spheroidizing agent sufficient to yield from about 0.02 to about 0.055 percent of the graphite-spheroidizing agent in the nodular iron without substantially detrimentally affecting the metallurgical properties of said nodular iron.

In another aspect of the present invention, there is provided an after-treating alloy agent for adding to molten nodular iron prior to casting which provides a reduction in the amount of graphite-spheroidizing agent used to obtain a desired nodularity which comprises a base alloy compatible with said nodular iron and from about 0.8 to about 1.8 percent magnesium.

The essence of the present invention is the discovery that the utilization of magnesium in a narrowly defined specific amount as an after-treating agent provides not only a significant beneficial effect with respect to the metallurgical (e.g., spheroidizing) properties of the melt but also effects a remarkable reduction in the amount of graphite-spheroidizing agent necessary to achieve a particular spheroidized state in the product as well as substantially improved (i.e., lessened) safety and health problems. That is, it has been found that the use of this particular amount of magnesium permits a reduction in the initial treatment of about 20 to 25 percent in the amount of graphite-spheroidizing agent. In addition, the size and distribution of nodules in the nodular iron product may be controlled by the particular treatment described herein. Also, it has been found that the use of the particular amount of magnesium substantially alleviates the possibility of an explosion in the melt. The magnesium recovery (considered as the total of increased magnesium content in the cast nodular iron and magnesium float-out loss from reaction with sulfur to desulfurize the melt divided by the amount of magnesium added in the after-treating agent) in the present invention is extremely high, i.e., at least about 85, often close to 100, percent.

DETAILED DESCRIPTION OF THE INVENTION

Figure 1:
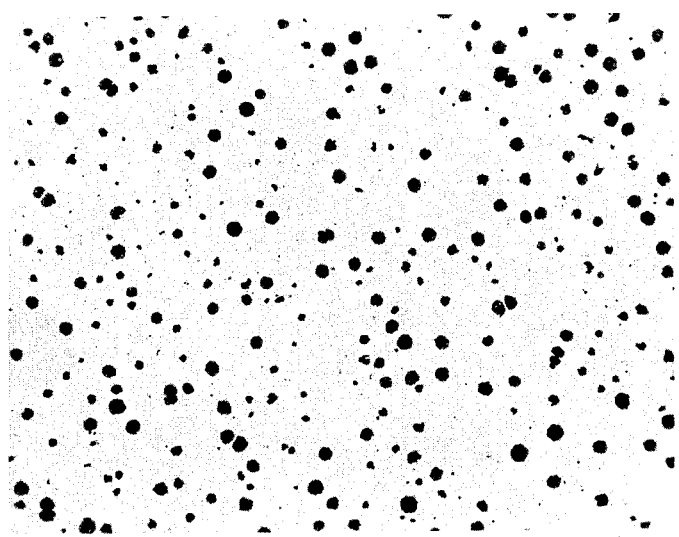
FIG. 1 is a photomicrograph of a nodular iron melt which had been contacted with the particular after-treating agent of the present invention.

Nodular cast iron is generally prepared by melting pig iron, steel, cast scrap and/or other conventional starting materials in amounts sufficient to produce an iron melt of proper composition. Preparation of the melt in this manner is well-known in the art.

The iron melt is thereafter contacted with one or more graphite-spheroidizing agents to substantially spheroidize the graphite in the iron. The composition of the graphite-spheroidizing agent and the technique for its introduction into the melt are also well-known in the art. The present invention will be further described with respect to magnesium as the graphite-spheroidizing agent in the spheroidizing treatment although it will be understood that other conventional graphite-spheroidizing agents may be utilized.

As noted above, the process of the present invention allows the use of a reduced amount of magnesium graphite-spheroidizing agent without substantially adversely affecting the metallurgical properties (and particularly the size, distribution and completeness of spheroidization) of the ultimate nodular cast iron. That is, while the initial (or "spheroidizing") treatment is generally carried out with an addition of magnesium sufficient to yield from about 0.03 to about 0.075, preferably from about 0.04 to about 0.06, most preferably from about 0.045 to about 0.055, weight percent magnesium in the ulimate cast nodular iron, it has been found the process of the present invention allows the use of magnesium in a reduced amount sufficient to yield in the molten nodular iron after the spheroidizing treatment from about 0.02 to about 0.055, preferably from about 0.045, most preferably from about 0.033 to about 0.042, weight percent magnesium to achieve the same spheroidization in the ultimate nodular iron. By a "reduced amount" is meant that at least about 10, generally at least about 15, often at least about 20 or more, percent less of the graphite-spheroidizing agent may be used in the initial treatment in the process of the present invention using the hereinafter specifically defined after-treating agent than a similar process without an after-treating agent or utilizing a typical prior art inoculant.

Any suitable graphite-spheroidizing agent and manner of introducing the agent into the molten iron may be utilized in the practice of the present invention. Magnesium or magnesium-rare earth alloys are preferred.

After the molten iron has been contacted with the graphite-spheroidizing agent and generally within about 15, typically within about 10, minutes of casting, the melt is contacted with an after-treating alloy containing from about 0.8 to about 1.8, preferably from about 1 to about 1.6, weight percent magnesium. The other components of the after-treating alloy can vary substantially providing that the alloy is otherwise compatible with and does not detrimentally affect the nodular iron. Typically, the after-treating alloy will be a silicon or ferrosilicon base alloy containing minor amounts of other suitable components such as aluminum, nickel, calcium, silicon or the like.

Suitable after-treating alloys can contain, for example, the following:

| Constituent | Weight Percent | | |
|---|---|---|---|
| Silicon | 45 | to | 83 |
| Aluminum | 0.1 | to | 4 |
| Magnesium | 1 | to | 1.6 |
| Calcium | 0.1 | to | 4 |
| Barium | 0.1 | to | 9 |
| Strontium | 0.1 | to | 4 |
| Iron | Balance | | |

Nickel-magnesium alloys can also be used. Other particular constituents may also be included in specific formulations.

The after-treating agent can be formed by melting and homogeneously mixing the particular components to form a chemically combined homogeneous alloy composition.

The after-treating agent is added to the melt in an amount of from about 0.25 to about 1.5, preferably from about 0.4 to about 0.8, weight percent of the melt with sufficient agitation to homogeneously disperse the after-treating alloy throughout the melt.

Magnesium recovery of the after-treating agent of the present invention is at least about 85, often approaching about 100, percent. Magnesium recovery is determined as (the total of increased magnesium content of the nodular iron and the magnesium loss from magnesium sulfide float-out) divided by the amount of magnesium added in the after-treating agent. As understood by those skilled in the art, magnesium reacts with sulfur present to form a magnesium sulfide and desulfurize the melt. The magnesium sulfide is generally removed by skimming prior to casting of the nodular iron.

The recovery of the magnesium graphite-spheroidizing agent in the initial (spheroidizing) treatment (determined in a similar manner as magnesium recovery above) is quite low, e.g., from about 20 to about 60, with an average of about 33, percent. The process of the present invention thus offers considerable savings in materials. Not only does the particular after-treatment utilized herein itself have a relatively high metal recovery, the present invention also allow a reduction in materials utilized in a prior, substantially poorer recovery step.

Figure 2:
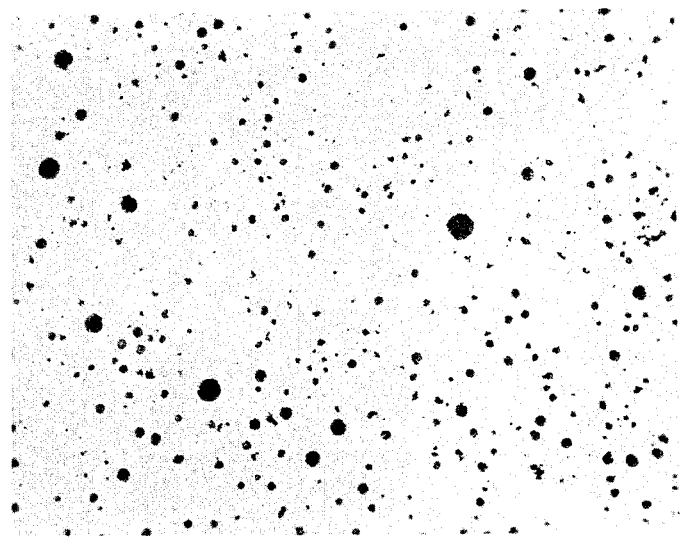
FIG. 2 is a photomicrograph of a similar nodular iron melt which had been contacted with a commercially available inoculating material.

In addition, utilization of the particular magnesium-containing after-treating agent of the present invention provides a safer, less hazardous environment for the production of nodular iron. That is, occasions of explosions, flare-ups, smoke generation and the like, which typically accompany the treatment of molten iron with magnesium are substantially reduced, The present invention also allows close control of the size and distribution of the graphite nodules in the nodular iron. FIG. 1 is a photomicrograph illustrating the microstructure of nodular iron which had been contacted 3 minutes before casting with 0.6 weight percent of the total melt of an after-treating alloy of 1 weight percent magnesium, 48 weight percent silica, 0.7 weight percent aluminum, 0.6 weight percent calcium, balance essentially iron. As may be seen, the graphite nodules are relatively uniform in size and distribution. In addition, each of the nodules appears essentially completely spheroidized. FIG. 2 is a photomicrograph of a similar nodular iron made in the same manner as the nodular iron of FIG. 1 and from the same ladle except that that after-treating agent was a standard inoculating agent which contained 47 weight percent silicon, 0.8 weight percent calcium and 1 weight percent aluminum.

The ultimate cast nodular iron after contact with the after-treating agent of the present invention generally contains from about 0.03 to about 0.075, preferably from about 0.04 to about 0.06, most preferably from about 0.045 to about 0.055, weight percent magnesium.

The invention is additionally illustrated in connection with the following Examples which are to be considered as illustrative of the present invention. It should be understood, however, that the invention is not limited to the specific details of the Examples.

EXAMPLE I

A number of heats of molten iron of essentially identical composition are made from pig iron, steel and iron scrap in a conventional manner. These heats are first contacted with a commercially available graphite-spheroidizing material containing 4.5 weight percent magnesium, 2.5 weight percent cerium, 50 weight percent silicon, balance essentially iron. The solid graphite-spheroidizing agent is placed in the bottom of a ladle and a sheet of solid iron is placed across the top of the agent. The molten iron melt is then poured into the ladle where it dissolves the iron sheet and the graphite-spheroidizing agent. The amount of graphite-spheroidizing agent is varied from 40 lbs/ton (a conventional amount for this type of nodular iron technique to achieve 0.05 weight percent magnesium in the ultimate cast nodular iron) to a reduced amount of 35 lbs/ton which would otherwise yield a magnesium content of 0.044 magnesium in the cast nodular iron. Magnesium recovery in the spheroidizing treatment is about 50 percent.

About 1.3 minutes prior to casting, the melt is contacted with either a commercially available inoculant alloy or an after-treating agent of the present invention. The commercially available inoculant contains (percent by weight) 48 percent Si, 0.8 percent Al, 0.7 percent Co, balance essentially iron. The composition of the after-treating agents of the present invention are as follows:

| After-Treating Agent | Composition, Weight Percent | | | | |
|---|---|---|---|---|---|
| | Mg | Si | Al | Ca | Fe |
| A | 1.0 | 48 | 0.7 | 0.6 | Balance |
| B | 1.6 | 77 | 1 | 1 | Balance |

The amount of graphite-spheroidizing agent, amount and type of pre-casting treatment, and the iron chemistry and mechanical properties of the resulting cast nodular iron as shown below in Table I.

A comparison of either Runs 1 and 2 with Run 3 (the latter being a conventional-type nodular iron process) shows that the process of the present invention achieves iron chemistry and mechanical properties at least as good as those of the conventional-type process with 12.5 weight percent less graphite-spheroidizing agent in the spheroidizing treatment. Run 4 exemplifies the conventional-type process also using 12.5 weight percent less graphite-spheroidizing agent in the spheroidizing treatment. Both the iron chemistry and mechanical properties of the resulting cast iron are less acceptable than any of Runs 1 to 3.

Microscopic examination of samples of each of the cast irons show that Runs 1 and 2 achieve complete nodularity of graphite with the nodules in each case being relatively uniform in size and distribution throughout the iron. The nodules in the iron of Run 3 are relatively uniformly distributed throughout the iron but are quite diverse in size. The nodules in Run 4 have not achieved 100 percent complete nodularity and are non-uniform both in size and distribution throughout the iron.

TABLE I

| Run | Amount of Graphite-Spheroidizing Agent Added lbs/ton | Pre-Casting Treatments lbs/ton | Iron Chemistry Weight Percent | | | | Magnesium Recovery Percent |
|---|---|---|---|---|---|---|---|
| | | | Mg | Ce | S | Si | |
| 1 | 35 | Agent A, 16 | 0.048 | 0.017 | 0.013 | 2.90 | 90 |
| 2 | 35 | Agent B, 14 | 0.040 | 0.028 | 0.107 | 2.95 | 92 |
| 3 | 40 | Commercial Inoculant A, 16 | 0.051 | 0.020 | 0.016 | 3.00 | — |
| 4 | 35 | Commercial Inoculant A, 16 | 0.039 | 0.022 | 0.017 | 2.78 | — |

| | Mechanical Properties | | | | |
|---|---|---|---|---|---|
| Run | Tensile Strength lbs/in$^2$ × 10$^3$ | Brinnel Hardness No. | Ratio Tensile Strength/ Brinnel Hardness | Yield Strength lbs/in$^2$ × 10$^3$ | Percent Elongation |
| 1 | 88.6 | 201 | 442 | 59.6 | 15 |
| 2 | 86 | 201 | 428 | 56.1 | 14 |
| 3 | 87.4 | 197 | 442 | 55.1 | 14 |
| 4 | 76.5 | 187 | 402 | 52 | 10 |

EXAMPLE II

A procedure similar to that of Example I is followed except that the graphite-spheroidizing agent is introduced into the cast iron by the "plunge process" in which the graphite-spheroidizing agent of Example I is rammed into the iron melt within a covered ladle. The pre-casting treatments are performed using another commercially available inoculant and after-treating agent C. These materials have the following composition:

|  | Composition, Weight Percent | | | | |
| --- | --- | --- | --- | --- | --- |
|  | Mg | Si | Ca | Al | Fe |
| Commercial Inoculant B | — | 78 | 1 | 1 | Balance |
| After-Treating Agent C | 1.21 | 46 | 0.9 | 1 | Balance |

The amounts used and properties obtained are shown below in Table II.

Again, a comparison of Runs 5 and 6 show that the present invention provides nodular iron with metallurgical and mechanical properties at least as good as those obtained from a conventional-type process with, in this case, a 32 percent reduction in the amount of graphite-spheroidizing agent used in the spheroidizing treatment. A similar reduction utilizing the conventional-type process (Run 7) results in a product of substantially inferior metallurgical and physical properties.

TABLE II

| Run | Amount of Graphite-Spheroidizing Agent Added lbs/ton | Pre-Casting Treatments lbs/ton | Iron Chemistry Weight Percent | | | | Magnesium Recovery Percent |
| --- | --- | --- | --- | --- | --- | --- | --- |
|  |  |  | Mg | Ce | S | Si |  |
| 5 | 8.5 | Agent C, 25 | 0.043 | 0.007 | 0.010 | 2.34 | 97 |
| 6 | 12.5 | Commercial Inoculant B, 15 | 0.056 | 0.007 | 0.012 | 2.80 | — |
| 7 | 8.5 | Commercial Inoculant B, 15 | 0.033 | 0.006 | 0.011 | 2.36 | — |

| Run | Mechanical Properties | | | | |
| --- | --- | --- | --- | --- | --- |
|  | Tensile Strength lbs/in$^2$ × 10$^3$ | Brinnel Hardness No. | Ratio Tensile Strength/ Brinnel Hardness | Yield Strength lbs/in$^2$ × 10$^3$ | Percent Elongation |
| 5 | 94.6 | 201 | 470 | 56.6 | 14 |
| 6 | 85.6 | 204 | 419 | 55.8 | 12 |
| 7 | 80.9 | 192 | 421 | 52.9 | 10 |

COMPARATIVE EXAMPLES

The procedure of Example I is repeated using magnesium-containing ferrosilicon alloys containing 0.5, 2.1, 2.3 and 3.5, weight percent magnesium as the after-treating agent. Each alloy contains about 48 weight percent silicon, balance essentially iron.

Each after-treating alloy is added to the melt (previously contacted with the graphite-spheroidizing material of Example I in the manner of Example I) in an amount of about 0.7 weight percent of the iron melt. A large amount of smoke and flare-ups accompany the introduction of the alloys containing 2.1 and 2.3 weight percent magnesium. Magnesium recovery for these alloys (measured as in Example I is about 40 percent). The addition of the 3.5 weight percent magnesium alloy produces billows of smoke and excessive flare-ups. Magnesium recovery is about 25 percent. The health and safety hazards created by the additions of the 2.1, 2.3 and 3.5 weight percent magnesium-containing alloys are so severe as to preclude their commercial use.

Addition of the 0.5 weight percent magnesium alloy does not produce the smoke or flare-ups and the magnesium recovery is high. However, in order to increase the amount of magnesium in the ultimate cast nodular iron when the magnesium graphite-spheroidizing agent has been reduced about 15 or more percent, the 0.5 weight percent magnesium alloy must be used in such large amounts as to increase the silicon content of the nodular iron above the desired maximum and detrimentally affect the metallurgical and physical properties of the nodular iron.

In comparison with the above, and to further illustrate the high magnesium recovery values obtainable with the present invention, after-treating agent C of Example II (1.21 weight percent magnesium) is added to a laboratory melt of magnesium-free iron at 2700° F. and in an amount of 6 percent by weight of the melt. No smoke or flare-up is observed at the time of addition and chemical analysis of the melt after addition shows 0.074 percent by weight magnesium which accounts for essentially all of the magnesium of after-treating agent C.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An after-treating alloy for adding to molten nodular iron prior to casting which provides a reduction in the amount of graphite-spheroidizing agent used to obtain a desired nodularity which consists essentially of a base alloy compatible with said nodular iron and selected from the group consisting of ferrosilicon and nickel alloys and from 0.8 to 1.8 weight percent magnesium.

2. The after-treating alloy of claim 1 wherein said base alloy is a ferrosilicon alloy consisting essentially of from 45 to 83 weight percent silicon, balance iron.

3. The after-treating alloy of claim 1 wherein said agent contains from 1 to 1.6 weight percent magnesium.

4. The after-treating alloy of claim 2 wherein said base alloy contains minor amounts of one or more metals selected from the group consisting of aluminium, calcium, barium, nickel and strontium.

* * * * *

UNITED STATES PATENT AND TRADEMARK OFFICE
CERTIFICATE OF CORRECTION

PATENT NO. : 4,084,962
DATED : April 18, 1978
INVENTOR(S) : Michael ROBINSON

It is certified that error appears in the above-identified patent and that said Letters Patent are hereby corrected as shown below:

In the Abstract, line 1, change "modular" to --nodular--.

Column 1, line 15, change "agent" to --agents--.

Column 1, line 68, after "aluminum,", insert --0.1 to 10 percent calcium,--.

Column 3, line 57, before "0.045" insert --0.03 to about--.

Column 4, line 59, change "allow" to --allows--.

Column 6, in Table I, the section entitled "Iron Chemistry Weight Percent", under "S", line 2, change "0.107" to --0.017--.

Signed and Sealed this

Twenty-sixth Day of June 1979

[SEAL]

Attest:

RUTH C. MASON
Attesting Officer

DONALD W. BANNER
Commissioner of Patents and Trademarks